Nov. 23, 1937.  W. E. GILMORE  2,100,076
GENERATOR OPERATION
Filed March 2, 1934  2 Sheets-Sheet 1
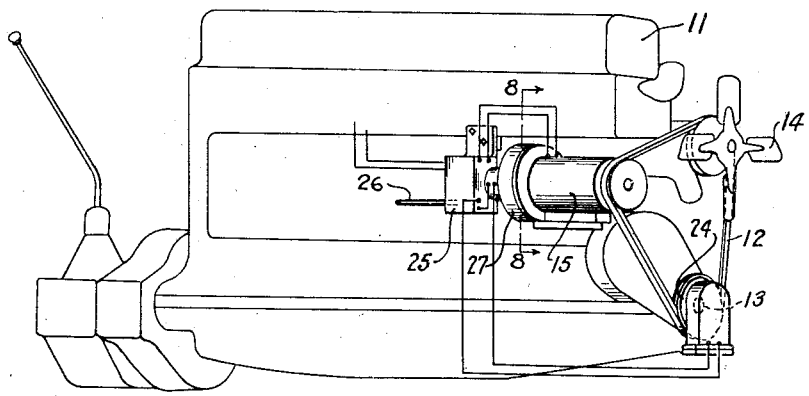
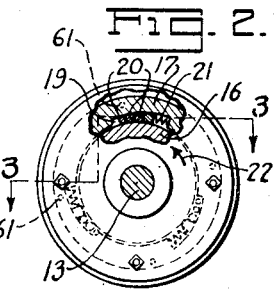
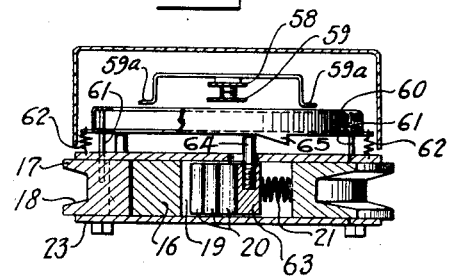
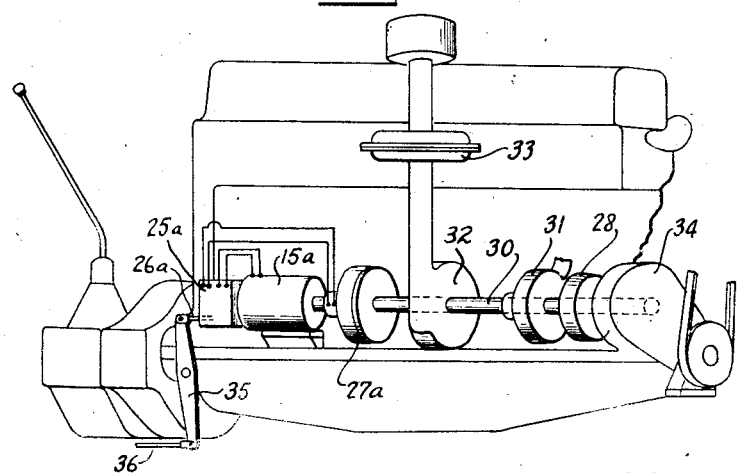
INVENTOR
William E. Gilmore
BY
Owen & Owen
ATTORNEYS Nov. 23, 1937.  W. E. GILMORE  2,100,076
GENERATOR OPERATION
Filed March 2, 1934  2 Sheets-Sheet 2
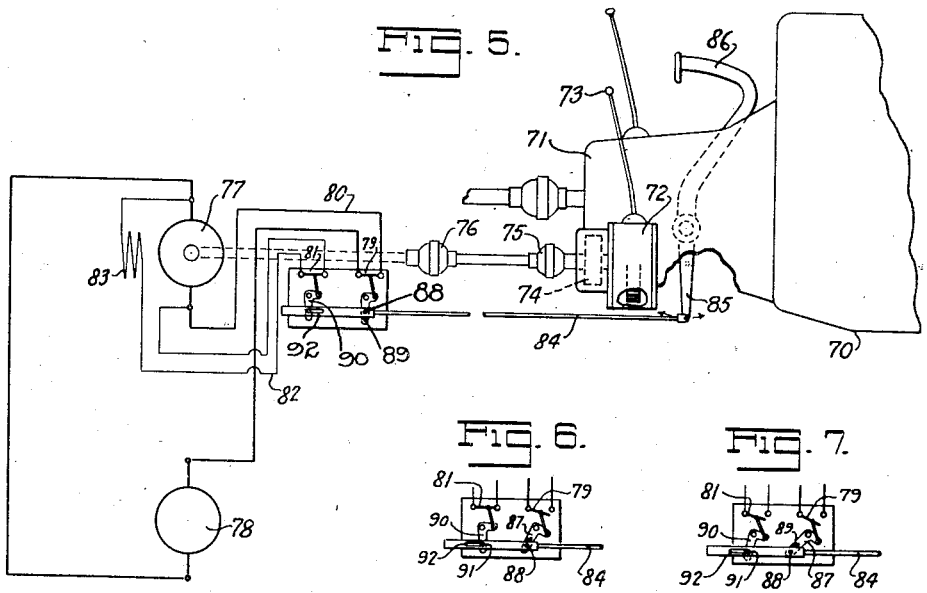
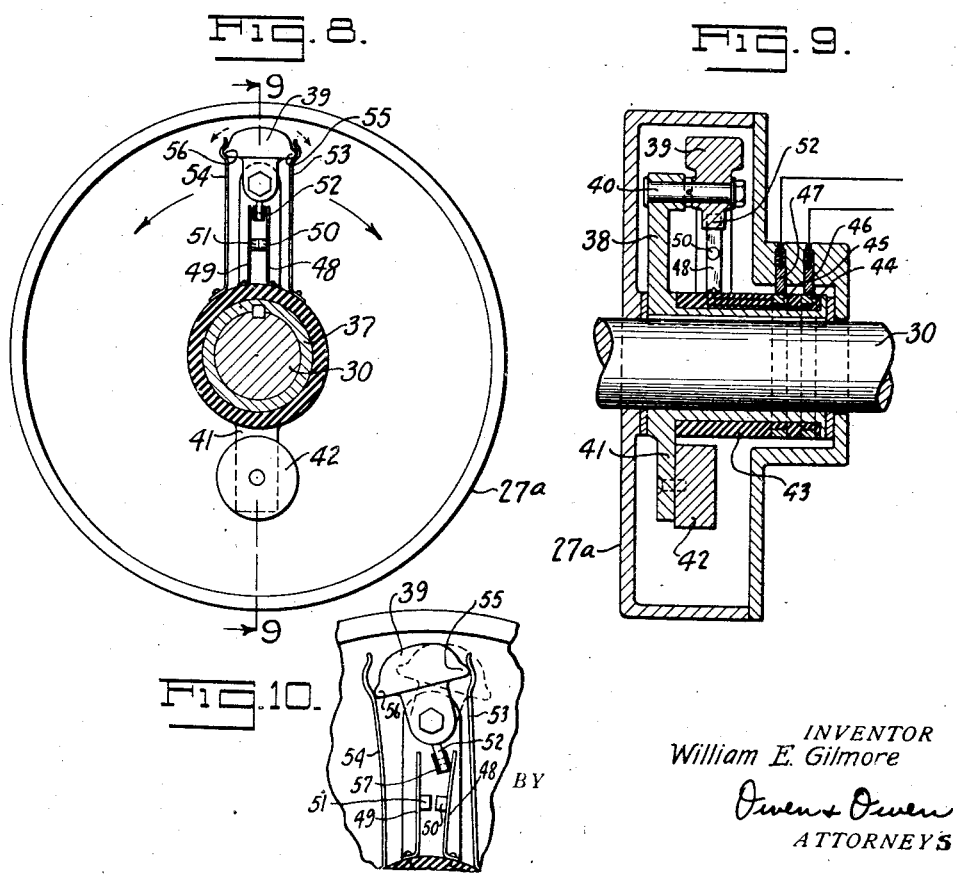
INVENTOR
William E. Gilmore
BY Owen + Owen
ATTORNEYS

UNITED STATES PATENT OFFICE 2,100,076

GENERATOR OPERATION

William E. Gilmore, Lyndhurst, N. J.

Application March 2, 1934, Serial No. 713,711

16 Claims. (Cl. 74—11)

This invention relates to the operation of generators and more particularly to the operation of a generator from a source of power which is liable to marked fluctuation, with provision for discontinuing the production of current by the generator without interfering with the continued rotation of the armature during violent fluctuations in the drive.

The object of the invention is to provide apparatus of the kind described, which will allow the continued rotation of the armature of the generator when the drive is suddenly discontinued, and which will open the field of the generator at such times or during sudden acceleration.

A particular object of the invention is to provide apparatus of the character described which will permit the connection of a generator to an automobile motor or the like and the rapid deceleration and acceleration of said motor without burdening it with the generation of current through the generator.

A further object of the invention is to provide apparatus of the character described, which may be driven from a standard transmission power take-off without interfering with the shifting of gears or the like.

Further objects of the invention will appear as the description proceeds.

In the drawings forming a part of this specification, Figure 1 is a somewhat diagrammatic illustration of one arrangement of apparatus embodying the invention; Figure 2 is a detail view showing the over-running clutch; Figure 3 is a detail section on the line 3—3 of Fig. 2; Figure 4 is a view similar to Figure 1, but showing the application of the invention in a somewhat different arrangement of accessory devices; Figure 5 is a diagrammatic view showing a standard power take-off from transmission with a wiring diagram of a generator driven thereby and a motor driven by the generator; Figures 6 and 7 are details of switches shown in Fig. 5, showing different positions of the switches; Fig. 8 is a section of a housing shown in Fig. 1 and is approximately on the line indicated by section line 8—8 on Fig. 1; Fig. 9 is a section approximately on the line 9—9 of Fig. 8, and Fig. 10 is a detail of a portion of Fig. 8, showing the parts in a different position.

In the embodiment of the invention illustrated in Fig. 1, the improvement is applied to the power plant of an automobile or truck. There is shown the usual motor housing 11 and a belt 12 driven by the motor through shaft 13, and driving fan 14, generator 15 and any other desired accessories, such as a pump.

In the device shown, belt 12 is driven from shaft 13 through an over-running clutch 24. This clutch may be of any suitable type, but in the embodiment shown there is a hub 16 driven from shaft 13 and driving a ring 17, which is grooved at 18 to receive belt 12. There are a plurality of notches 19 in the ring, these notches having eccentric outer surfaces and within the spaces provided by these notches there are mounted rollers 20 of graduated sizes, which are normally pressed towards the narrow end of the space by a spring 21 in the wider end of the notch. This will provide a secure clutch when the hub 16 is turning in the direction of arrow 22, but will promptly release the ring if for any reason it should tend to travel faster than the hub. Ring 17 is held in place by flanges 23.

The field of the generator is controlled by devices which cut it out at times when it is undesirable to have the generator produce current. In this embodiment of the invention the field is controlled by suitable devices within a switch box 25. There is shown a rod 26, which is preferably connected with some portion of the clutch of the vehicle, so that when the clutch is out the field of the generator is opened. There is also provided a suitable inertia governor within a housing 27. This inertia governor opens the field of the generator upon sudden acceleration or deceleration of the generator armature. The details of one form of such a governor are shown in Figs. 8, 9 and 10, and will be described later.

In Fig. 4 there is shown a somewhat similar embodiment of the invention, but in this construction the generator shaft 30 also drives a pump 31 and a suitable gear train enclosed in a housing 32, which gear train drives a supercharger 33. Drive shaft 30 is driven through an over-running clutch 28 and a suitable gear train within a housing 34 and driven in a suitable manner from the crank shaft of the motor, as will be readily understood.

In this construction the generator 15a has its field controlled from a switch box 25a in a manner similar to that described in connection with Figure 1, that is, a rod 26a is connected to a lever 35, which in turn is actuated by a rod 36 connected to the vehicle clutch so as to open the field of the generator when the clutch is released. The field likewise may be opened by an inertia governor 27a, which may be of the same type as that shown in Fig. 1.

In the type of inertia control shown in detail in Figs. 8, 9 and 10, there is mounted on generator shaft 30 a sleeve 37 from which there projects an arm 38. A weight 39 is pivoted at 40 to arm 38. Opposite arm 38 there is an arm 41 carrying a counterbalancing weight 42.

Around sleeve 37 there is an insulating member 43 in which there are mounted two slip rings 44 and 45, which are in contact with wipers 46 and 47 leading to the field of the generator. Electrically connected with rings 40 and 45, respectively, there are two spring members 48 and 49 carrying contacts 50 and 51. A lug 52 carried by weight 39 extends between the ends of spring members 48 and 49 so that the movement of the lug in either direction separates the contacts, as clearly shown in Fig. 10.

Weight 39 is normally held in the position in which it is shown in Fig. 8 by centrifugal force and also by retaining springs 53 and 54, which engage ears 55 and 56 on the weight and so tend to hold it in radial alignment with arm 38 and to return it to that alignment after it has been swung to the position in which it is shown in Fig. 10. Lug 52 may be covered with insulating material 57 in order to maintain the insulation of contacts 50 and 51.

For reasons which will be explained later, it is preferable to include in the field circuit in series with the connections just described a switch which is normally closed, but is opened when overrunning clutch 24 becomes operative. This construction is shown somewhat diagrammatically in Fig. 3. Contact carrying members 58 and 59, somewhat similar to members 48 and 49, are mounted adjacent the overrunning clutch and their contacts normally complete the circuit through the field of the generator, but at times their contacts may be separated in the following manner:

Member 58 carries arms 59ª adjacent to ring 60, which is mounted upon pins 61 projecting from flange 23. Pins 61 insure the rotation of ring 60 with flange 23 to allow the movement of the ring towards and from the flange. Normally the ring is drawn to its position nearest the flange by springs 62, and when in that position does not contact arms 59ª.

The follower 63 between spring 21 and rollers 20 is provided with an outstanding pin 64. There is a wedging lug 65 on ring 60. When the clutch is in operative position, follower 63 is moved to a position where pin 64 contacts the thin end of wedge 65, but when the rollers are moved to compress spring 21 during the overrunning action of the clutch, pin 64 is carried up wedge 65 and thereby presses ring 60 away from flange 23 and against arms 59ª and thereby separates the contacts carried by members 58 and 59 and so opens the field of the generator.

In the construction shown in Fig. 5, there is the usual motor within casing 70 and from transmission 71 there is a standard power take-off device 72, the details of which need not be shown. There is provided the usual clutch operative by handle 73 to connect the power take-off with the transmission or to disconnect it as desired.

Power take-off 72 drives one member of an overrunning clutch 74, which may be similar to that shown in Figs. 2 and 3. The shaft driven thereby is connected through universal joints 75 and 76 with a generator 77, diagrammatically shown in the wiring diagram as a direct current generator. The generator is shown as being connected to drive a motor 78 for operating any desired accessory. A switch 79 is provided in the circuit 80 connecting generator 77 with motor 78 and a switch 81 is provided in the circuit 82 of the field 83 of generator 77. Switches 79 and 81 are operated by a rod 84 connected to an extension 85 of the usual clutch pedal 86.

Switch 79 is operated by a bell crank lever 87 connected to rod 84 by a pin 88 working in a slot 89 in one arm of the bell crank, while switch 81 is operated by a bell crank 90, carrying a pin 91 working in a slot 92 in rod 84. As will be seen from an examination of Figs. 6 and 7, movement of rod 84, as viewed in those figures, opens switch 79 and then switch 81. Because of the lost motion provided by slot 92, it will be readily seen that a reverse movement of the rod closes switch 79 first and switch 81 later.

The operation of the device will be fairly apparent from the above-detailed description, but may be summarized as follows:

It will be readily seen that in the construction shown in Figs. 1 and 4, opening of the customary motor clutch operates through rod 26 or 26ª to open the field of the generator so that there is not the drag of the generator current upon the motor during the shifting of the gears. Likewise, it will be readily seen that the inertia switch shown in Figs. 8, 9 and 10 results in opening the field of the generator whenever there is a sudden acceleration or deceleration of the driving motor. When the inertia switch is opened because of sudden acceleration, the inertia member 39 is returned to its customary switch closing position by centrifugal force and springs 53 and 54 as soon as the speed becomes approximately constant.

When the motor is suddenly decelerated, inertia member 39 likewise opens the field of the generator and allows the armature to continue high speed rotation through its own momentum. This results in overrunning of clutch 24 or 28 and because of the overrunning of the clutch, the contacts carried by members 58 and 59 are separated. As soon as the speed of the motor shaft 30 becomes approximately constant, weight 39 returns to its switch closing position, but the field circuit is not closed until the armature of the generator and the other accessories connected to the same shaft are slowed up to the speed of the motor or the motor is speeded up to equal the speed of the generator shaft so as to again engage the overrunning clutch.

As a result of the above construction, it will be seen that the vehicle motor can be suddenly decelerated and accelerated without placing excessive strain upon the shaft running the motor and other accessories. This has obvious advantages where the usual accessories are run as indicated in Fig. 1, since it allows momentary slowing of the vehicle and prompt acceleration thereof without necessitating the speeding up of the generator and other accessories during the acceleration of the car until the acceleration of the motor equals the speed at which these parts have continued to move by their momentum. In the construction indicated in Fig. 4, the arrangement is more important because it allows a more constant action of the supercharger 33. This is run customarily at very high speeds and when the motor is suddenly decelerated, the slowing up of the drive shaft is sufficiently sudden to place a great strain upon the supercharger, the speed of deceleration being increased by the braking action of the generator. By cutting out the field of the generator during deceleration, this swift deceleration is avoided and the rate of deceleration is made more nearly equal to the normal rate of acceleration and, therefore, does not require greater strength in the parts operating the supercharger than is required for normal accelerating action.

In the construction shown in Fig. 5, the combined overrunning clutch and arrangement for opening the field of the generator during shifting provides for the temporary release of the transmission from the drag or push of the power take-off during shifting of gears. Hitherto, where such a power take-off has been employed for driving a generator of considerable size, it has rendered the shifting of gears during the travel of the vehicle difficult, if not impossible.

Such a construction is particularly desirable for a truck carrying a refrigerating device, cement mixer, or other apparatus driven by motor 78. It allows the substantially continuous operation of the accessory motor 78 without interfering with the normal operation of the truck.

In the construction shown, the two switches 79 and 81 are provided, with switch 79 opening and closing before switch 81 in order to avoid too great an electric shock through motor 78. It will be readily apparent that where conditions require, an equivalent result may be obtained by employing a rheostatic starting switch of well-known type so that the current will not be turned on to the motor too suddenly.

It will be readily understood that accessories besides the generator 77 may be driven from the power take-off shown in Fig. 5 and also that various accessories may be driven in combination with the generator in arrangements similar to those shown in Figs. 1 and 4. Also it will be apparent that while an electric motor for driving accessories is shown only in the arrangement illustrated in Fig. 5, similar motors may be driven by generators connected up as in Figs. 1 and 4, if desired. Also, while three different arrangements have been shown in which the generator armature is driven through an overrunning clutch with provision for cutting out the field while the overrunning clutch is in operation, a similar combination of overrunning clutch for the generator drive and field cut-out during the operation of the overrunning clutch may be used in any other combination of generator drive where the conditions render their use necessary or advisable. Also, while the inertia switch described herein is intended primarily for use in connection with an overrunning clutch, it will be evident that it could be used without an overrunning clutch where there are sudden variations in the power applied to driving the generator shaft and where no overrunning clutch is used. While for brevity, reference is made to opening the field of the generator, the purpose is to take the load off the armature and allow it to rotate freely, and opening switch 79 and thus opening the load circuit relieves the generator armature of the load of this circuit. With any type of generator, opening switches resulting in relieving the generator from its load and allowing the armature to continue rotation without retardation by the generated current is the equivalent of opening the field in the type of generator and electric motor connection disclosed herein. Accordingly, the appended claims are not restricted to the specific arrangements shown in the drawings, except as stated in the claims.

What I claim is:

1. In combination, a generator having an armature and a field, an over-running clutch, means for driving the armature through the clutch, and means for opening the circuit of the generator field during the desired operation of the over-running clutch.

2. In combination, a generator having an armature and a field, an over-running clutch, means for driving the armature through the clutch, and means for opening the circuit of the generator field during the desired operation of the over-running clutch, the last said means comprising a switch opened by the over-running of the clutch.

3. In combination, a generator having an armature and a field, an over-running clutch, means for driving the armature through the clutch, and means for opening the circuit of the generator field during the desired operation of the over-running clutch, the last said means comprising a rotary inertia switch driven with the generator armature and opening upon sudden acceleration thereof.

4. In combination, a generator having an armature and a field, an over-running clutch, means for driving the armature through the clutch, and means for opening the circuit of the generator field during the desired operation of the over-running clutch, the last said means comprising a rotary inertia switch driven with the generator armature and opening upon sudden deceleration thereof.

5. In combination, a generator having an armature and a field, an over-running clutch, means for driving the armature through the clutch, and means for opening the circuit of the generator field during the desired operation of the over-running clutch, the last said means comprising a rotary inertia switch driven with the generator armature and opening upon sudden change in the rate of rotation thereof.

6. In combination, a generator having an armature and a field, an over-running clutch, means for driving the armature through the clutch, and means for opening the circuit of the generator field during the desired operation of the over-running clutch, the last said means comprising a rotary inertia switch driven with the generator armature and opening upon sudden change in the rate of rotation thereof, and a switch opened by the over-running of the clutch.

7. In combination, a generator having an armature and a field, means for driving the armature, and a rotary inertia switch in the field circuit, driven with the armature, opening upon sudden change in its rate of rotation, and closing and remaining closed during approximately constant speed running, regardless of the rate of such constant speed.

8. In a motor vehicle, a generator having an armature and a field, an over-running clutch, means normally driving the armature from the motor of the vehicle through the over-running clutch, and means for opening the field during the desired operation of the over-running clutch.

9. In a motor vehicle, a generator having an armature and a field, an over-running clutch, means normally driving the armature from the motor of the vehicle through the over-running clutch, and means for opening the field during the desired operation of the over-running clutch, the last said means comprising means, actuated by the releasing of the vehicle clutch, for opening the field.

10. In a motor vehicle, a generator having an armature and a field, an over-running clutch, means normally driving the armature from the motor of the vehicle through the over-running clutch, and means for opening the field during the desired operation of the over-running clutch, the last said means comprising a switch opened by deceleration of the motor drive shaft and a switch opened by the over-running of the over-running clutch.

11. In a motor vehicle, a generator having an armature and a field, mechanically driven accessories, an over-running clutch, means normally driving said armature and accessories from the motor of the vehicle through the over-running clutch, and means opening the field of the generator during the desired over-running action of the clutch.

12. In a motor vehicle having a clutch, a transmission, and power take-off form said transmission, a generator having an armature and a field, an over-running clutch, means to drive the armature from the power take-off through the over-running clutch, and means for opening the field during the desired over-running of the clutch.

13. In a motor vehicle having a clutch, a transmission, and power take-off from said transmission, a generator having an armature and field, an over-running clutch, means to drive the armature from the power take-off through the over-running clutch, and connections from the vehicle clutch opening the field when the vehicle clutch is released.

14. In a motor vehicle having a clutch, a transmission, and a power take-off from the transmission, a generator having an armature and a field, a motor, a circuit normally connecting the motor and generator to drive the motor from the generator, an over-running clutch, means driving the armature from the power take-off through the over-running clutch, and means opening the field during desired over-running of the clutch.

15. In a motor vehicle having a clutch, a transmission, and a power take-off from the transmission, a generator having an armature and a field, a motor, a circuit normally connecting the motor and generator to drive the motor from the generator, an over-running clutch, means driving the armature from the power take-off through the over-running clutch, and means opening the field during desired over-running of the clutch and for opening the motor-driving circuit prior to the opening of the field.

16. In a motor vehicle having a clutch, a transmission, and a power take-off from the transmission, a generator having an armature and a field, a motor, a circuit normally connecting the motor and generator to drive the motor from the generator, an over-running clutch, means driving the armature from the power take-off through the over-running clutch, a switch in the motor-driving circuit, a switch in the field circuit, and connections to the vehicle clutch opening, first the motor switch and then the field switch, when the vehicle clutch is released, and closing first the motor switch and then the field switch when the vehicle clutch is engaged.

WILLIAM E. GILMORE.